United States Patent [19]
Ranjan

[11] Patent Number: 5,852,568
[45] Date of Patent: Dec. 22, 1998

[54] SYSTEM AND METHOD FOR A FAST CARRY/SUM SELECT ADDER

[75] Inventor: Nalini Ranjan, Sunnyvale, Calif.

[73] Assignee: S3 Incorporated, Santa Clara, Calif.

[21] Appl. No.: 788,391

[22] Filed: Jan. 27, 1997

[51] Int. Cl.$^6$ ........................................................ G06F 7/50
[52] U.S. Cl. ............................................................. 364/788
[58] Field of Search ................................................. 364/788

[56] References Cited

U.S. PATENT DOCUMENTS

| | | | |
|---|---|---|---|
| 3,316,393 | 4/1967 | Ruthazer | 364/788 |
| 5,229,959 | 7/1993 | Scriber | 364/788 |
| 5,272,662 | 12/1993 | Scriber et al. | 364/788 |
| 5,579,254 | 11/1996 | Kumar et al. | 364/788 |
| 5,631,860 | 5/1997 | Morinaka | 364/788 |

*Primary Examiner*—David H. Malzahn
*Attorney, Agent, or Firm*—Fenwick & West LLP

[57] ABSTRACT

An adder system includes at least one adder block subsystem. Each adder block subsystem includes a pair of input signal lines, an adder circuit block having a conditional sum-select and a conditional carry-select, a sum-high line, a sum-low line, a carry-high line, carry-low line, a sum selection switch, a carry selection switch, a carry forward line, and an output signal line. The input lines are individual bit lines that are paired together from the least significant bit to the most significant bit. Within the adder circuit block, pairs of the input bit lines are coupled to the conditional sum-select and the conditional carry-select. The conditional sum-select is coupled to the sum-high and sum-low lines and the conditional carry-select is coupled to the carry-high and carry-low line. The sum selection switch selectively couples the output signal line to the sum-high or the sum-low line. The carry selection switch selectively couples the carry-high or carry-low line to the carry forward line that is coupled to the next adder subsystem which is structured similarly. The carry signal of the adder system is determined through the conditional carry selects of the adder circuit blocks. Each conditional carry-select includes logic OR and logic AND subcircuits to which each of the pairs of input bit lines is respectively coupled. The outputs of the logic OR and logic AND subcircuits are coupled to one or more line multiplexes to selectively produce a logic high or logic low signal that serves as the individual carry bit signals for the carry signal. A method for an adder system is also disclosed.

9 Claims, 6 Drawing Sheets

SYSTEM AND METHOD FOR A FAST CARRY/SUM SELECT ADDER

BACKGROUND OF THE INVENTION

1. Field of the Invention

The present invention relates to a system and method for binary calculations. More particularly, the present invention relates to a system and method for a binary adder circuit.

2. Description of the Related Art

Adder circuits, are known in electronic digital circuits. Adder circuits are used for performing the parallel addition of two n-bit numbers, where n can be any integer. Conventional logic elements may be used in adder circuits to add two numbers together and provide a carry-out and carry-in, where applicable. Typical adder circuits include carry-ripple adders, carry-look-ahead parallel adders, and conditional sum/carry selection adders.

The simplest adder circuit is a carry-ripple adder. A carry-ripple adder uses a full-adder logic circuit having a first and a second summand input signal into the full adder circuit plus a carry-out signal from a previous bit as a third input signal into the full adder circuit. In carry-ripple adder circuits the carry bit is propagated from the least significant bit to the most significant bit. The carry-ripple adder circuit provides a simple implementation of an adder circuit. A disadvantage, however, of the carry-ripple adder is that because the carry bit must propagate through each stage of a circuit, there is a significant propagation delay which limits circuit operation speed. Therefore, the carry-ripple adder circuit is unsuitable for large-bit width adder circuits, e.g., 32-bit or greater adder circuits, where circuit operation speed is important.

To increase the operational speed for an arithmetic process, carry look-ahead adder circuits are used. Carry look-ahead adder circuits are comprised of standard full-adder logic circuit components that include a first set of input signal lines for each bit signal, plus a separate set of carry signal lines tied to the input signal lines to separately determine whether a carry signal will occur. For example, the carry look-ahead circuit may evaluate the four low-order input bit signals of two 8-bit numbers being added together to determine if they will generate a carry-out from a downstream full-adder circuit. The four higher-order inputs can thus be added together without having to wait for the carries to propagate through the low-order full-adders.

In carry look-ahead adder circuits each summand input signal is broken into input blocks, with each input block being added independently with a carry-in signal and, if necessary, producing a carry-out signal. The carry out signals are calculated through the use of logic carry-out blocks. The carry-out signal for each input block is calculated from each carry-out block from the summand input signal, and then the calculations are cascaded together to form a wide-bit adder. The carry look-ahead circuit increases circuit operation speed for completing an arithmetic operation. Disadvantages of the carry look-ahead circuit, however, include duplicative logic necessary for implementing a summand input signal and a carry-out signal for each stage. Moreover, as the number of circuit stages increases, the number of carry-out blocks increases exponentially. The increased circuit stages begin to also cause an increase in the number of propagation delays. Therefore, for adder circuits with large bit-widths, e.g., 32-bits or greater, there is a significant increase in chip surface area needed to implement the adder, an increase in cost for incorporating the necessary logic for each circuit stage, and an increase in propagation delays that would cancel out initial increases in circuit operational speed.

To reduce the number of logic elements an adder may be implemented as a conditional sum/carry selections adder circuit The conditional sum/carry selections adder circuit consists of conventional logic elements with switches to select particular logic levels. In the conditional sum/carry selections adder circuit, two sums are calculated along with two sets of carries. One carry assumes an input carry signal, i.e., a carry-in signal, to summand as logic zero ("0") and the other carry assumes an input carry signal, i.e., a carry-in signal, to summand as logic one ("1"). Then, based on the actual logic value of the carry-in signal, a correct sum signal and a carry-out signal is selected.

The conditional sum/carry selections adder circuit uses fewer logic circuit elements than a carry look-ahead adder circuit, and therefore requires a smaller chip surface area to implement. The conditional sum/carry selections adder circuit, however, introduces propagation delays because a carry-in signal bit is propagated from the least significant bit to the most significant bit within each logic block. Once again, for wide-bit adder circuits of 32-bits or greater there is a significant propagation delay that limits the circuit operation speed. Thus, the conditional sum/carry selections adder is inadequate for adder circuits, especially wide-bit adder circuits, requiring faster circuit throughout.

Therefore, there remains a need for an adder system having a reduced number of logic circuit elements and having a greater operational throughput speed by minimizing the propagation delays through the adder system.

SUMMARY OF THE INVENTION

The present invention includes an adder system that comprises at least one adder circuit block subsystem that includes a carry. Each adder block subsystem includes an adder circuit block having at least one conditional sum select and at least one conditional carry select. The conditional sum select is coupled to receive a first set of input bit signals and a second set of input bit signals and is also coupled to receive a first set of carry-select bit signals and a second set of carry-select bit signals. The carry-select bits are generated by the conditional carry select.

The conditional sum select includes individual input lines for each input bit signal of the first and the second set of input bit signals. One bit from each of the first and the second set of input bit signals is are paired together beginning with the least significant bits and moving to the most significant bits. For each pair of input bit signals, the conditional sum select includes a logic adder, a first and a second logic adder sum out line, a first and a second switch multiplexer, a carry-high line, a carry-low line, and a sum-high and a sum-low line. The logic adder is coupled to receive the pair of input bit signals and output a sum signal representing a sum of the pair of input bit signals along the first logic adder sum out line and the inverse of the sum along the second logic adder sum out line.

The carry-low line is coupled to the first switch multiplexer. The first switch multiplexer is coupled to the first logic adder sum out line if the carry-low line has a logic high (high=1) signal and is coupled to the second logic adder sum out line if the carry-low line has a logic low (low=0) signal. The first switch multiplexer is also coupled to the sum-low output line. The carry-high line is coupled to the second switch multiplexer. The second switch multiplexer is coupled to the first logic adder sum out line if the carry-high line has a logic high signal, and is coupled to the second logic adder sum out line if the carry-high line has a logic low signal. The second switch multiplexer is also coupled to the sum-high output line. Thus, the sum signal along each of the low and the high sum output lines is dependent upon the logic signal along the carry-low line and the carry-high line in addition to the logic adder function performed on each pair of input bit signals.

The carry signals along the 1-bit carry-high lines and the 1-bit carry-low lines are from the conditional carry select. The input signal bits paired for the conditional sum select are also paired for the conditional carry select. Each pair of input signal bits is coupled to a logic OR subcircuit and to a logic AND subcircuit. The conditional carry select also includes a first through a sixth set of line multiplexers. The first and the second set of line multiplexers includes four line multiplexers. Each line multiplexer in the first and the second set of line multiplexers is coupled to the second, fourth, sixth, and eighth logic OR and logic AND subcircuits, respectively. The line multiplexers of the first and the second set of line multiplexers switch between the logic OR subcircuit output or the logic high subcircuit output based on whether the output signal from the previous logic OR subcircuit (1st set) and the previous logic AND subcircuit (2nd set) was a logic high or a logic low, respectively.

The third and the fourth set of line multiplexers include three line multiplexers. The first line multiplexers of the third and the fourth set of line multiplexers are switched through the output signal from the first line multiplexers of the respective first and the second set of line multiplexers. The second line multiplexers of the third and the fourth set of line multiplexers are switched based on the output signal from the respective first line multiplexer signals of the third and the fourth set of line multiplexers. The third line multiplexers of the third and the fourth set of line multiplexers are switched based on the output from the respective second line multiplexers of the third and the fourth set of line multiplexers.

The fifth and the sixth set of line multiplexers each include three line multiplexers. The three line multiplexers of the fifth and the sixth set of line multiplexers are respectively coupled to the outputs of the third, fifth and seventh logic OR and logic AND subcircuits. The first line multiplexers of the fifth and the sixth set of line multiplexers are switched using the output from, respectively, the first line multiplexers of the first and the second set of line multiplexers. The second line multiplexers of the fifth and the sixth set of line multiplexers are switched using the outputs from, respectively, the first line multiplexers of the third and the fourth set of line multiplexers. The third line multiplexers of the fifth and the sixth set of line multiplexers are switched using the outputs from, respectively, the second line multiplexers of the third and the fourth set of line multiplexers.

The conditional carry select produces the carry bit signals for the carry of the added n-bit input signals along the carry-high lines and the carry-low lines, of which one is coupled for each bit to produce the output signal. The first carry bit lines (least significant) are coupled to the logic OR subcircuit of the 1-bit carry-high line and the logic AND subcircuit of the 1-bit carry-low line. The first line multiplexers of the first and the second set of line multiplexers are coupled, respectively, to the next 1-bit carry-high line and 1-bit carry-low line of the second least significant bit of the n-bit carry signal. The first line multiplexers of the fifth and the sixth set of line multiplexers are coupled to the third least significant 1-bit carry-high line and 1-bit carry-low line, respectively. The first line multiplexers of the third and the fourth set of line multiplexers are coupled to the fourth least significant 1-bit carry-high line and 1-bit carry-low line, respectively.

The second line multiplexers of the fifth and the sixth set of line multiplexers are coupled to the fifth least significant 1-bit carry-high line and 1-bit carry-low line, respectively. The second line multiplexers of the third and the fourth set of line multiplexers are coupled to the sixth least significant 1-bit carry-high line and 1-bit carry-low line, respectively. The third line multiplexers of the fifth and the sixth set of line multiplexers are coupled to the second most significant (seventh least significant) 1-bit carry-high line and 1-bit carry-low line, respectively. The third line multiplexers of the third and the fourth set of line multiplexers are coupled to the most significant 1-bit carry-high line and 1-bit carry-low line, respectively.

During operation of the present invention, the first and the second n-bit input signals are simultaneously fed to each adder block subsystem and specifically to the conditional sum select and the conditional carry select. In the conditional sum select, the individual pairs of bits of the first and the second n-bit input signals are added. Simultaneously, a carry signal is determined through the conditional carry select. For an n-bit carry signal, n–1 individual bits are forwarded to the conditional sum select to switch the first and the second multiplexer switches coupled to each logic adder. Thus, the adder block subsystem outputs a sum signal of the least significant digit of the added pairs of bits and also outputs a carry bit, the nth bit of the carry signal. The nth carry bit is forwarded to the next adder block subsystem where it provides the signal for switching a sum output selection switch and a carry selection switch. If there are no more adder block subsystems, the carry signal is output from the adder system as the carry signal of the adder system.

The present invention offers an advantage of using a conditional carry select having a plurality of line multiplexers so that the number of gate delays during a summation operation with a carry operation is reduced. The present invention thus provides an advantage of increasing overall circuit operation speed. Moreover, the present invention offers an advantage of reducing the amount of chip circuitry necessary for a wide-bit adder with a carry and, in turn, the amount of chip surface area necessary to implement the wide-bit adder with a carry because the line multiplexers may be conditionally switched to propagate a carry signal rather than adding circuit elements for a carry signal to be propagated.

The features and advantages described in the specification are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
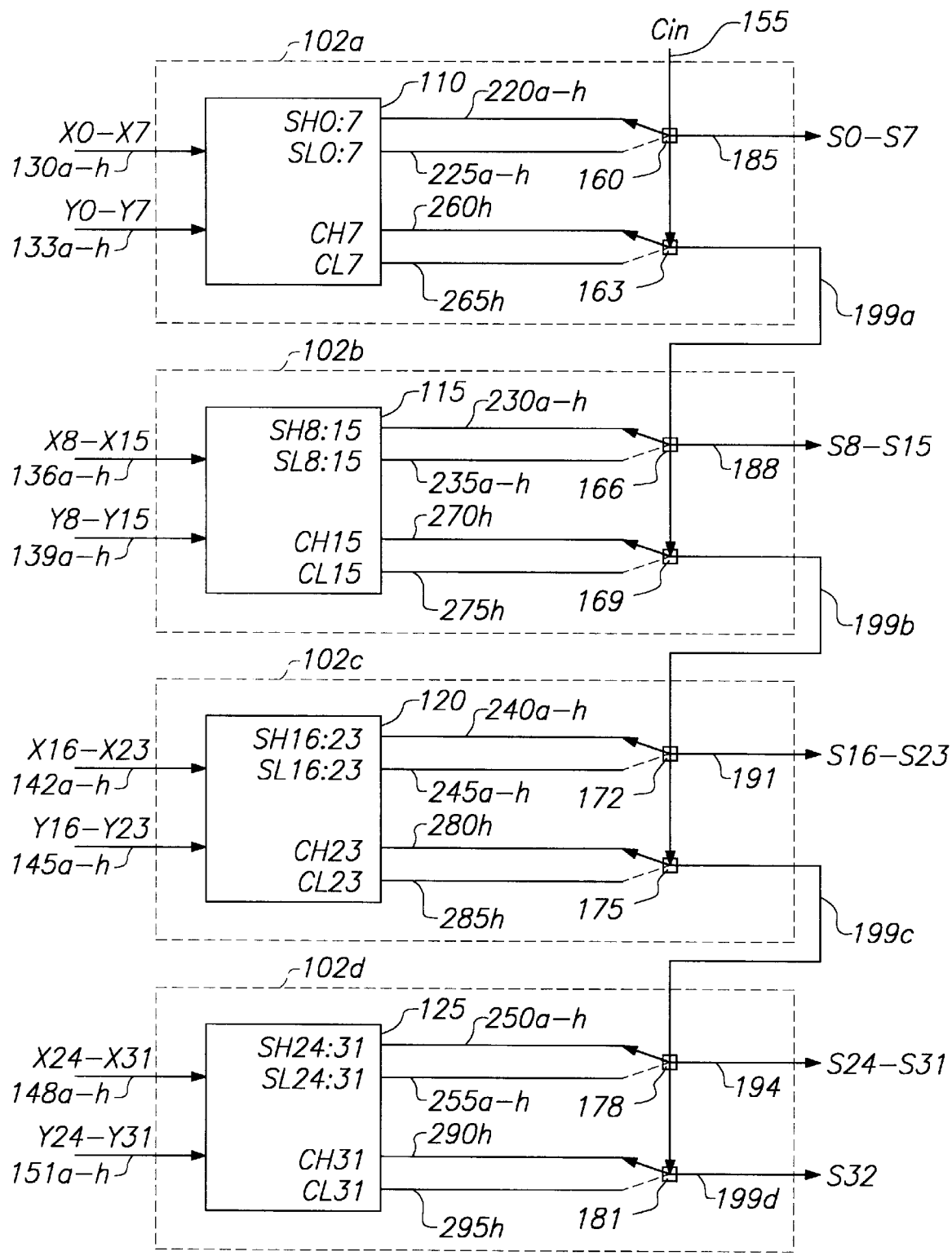
FIG. 1 is a block diagram of an adder system in accordance with the present invention.

The present invention provides a system and method for an adder system having a sum and carry and that includes minimal propagation delays. FIG. 1 is a block diagram illustrating a 32-bit adder system 100 in accordance with the present invention. It is noted that the adder system 100 may be an x-bit adder where x is any integer.

The adder system 100 is comprised of one or more adder block subsystems 102a–d. In one embodiment, the adder system 100 is a 32-bit adder having a first through a fourth adder block subsystem 102a–d. Each adder block subsystem 102a–d includes an adder circuit block 110, 115, 120, 125. Particularly, the adder system 100 in FIG. 1 is a 32-bit adder and includes a set of four 8-bit adder circuit blocks 110, 115, 120, 125. Each adder circuit block 110, 115, 120, 125 is comprised of a conditional sum-select circuit 210 and a conditional carry-select circuit 215 further described below in FIGS. 2–5.

Each adder circuit block 110, 115, 120, 125 includes a first n-bit input line 130a–h, 136a–h, 142a–h, 148a–h and a second n-bit input line 133a–h, 139a–h, 145a–h, 151a–h where n is any integer that is a multiple of x such that all the n bits added together total x. In a preferred embodiment, the input signals are each 32-bits wide so that n is 8 and each input into each adder circuit block 110, 115, 120, 125 is 8-bits wide. Each adder circuit block 110, 115, 120, 125 also includes an n-bit high-sum line 220a–h, 230a–h, 240a–h, 250a–h, an n-bit low-sum line 225a–h, 235a–h, 245a–h, 255a–h, an m-bit carry-high line 260h, 270h, 280h, 290h, an m-bit carry-low line 265h, 275h, 285h, 295h, a sum output selection switch 160, 166, 172, 178, and a carry selection switch 163, 169, 175, 181. In a preferred embodiment, the m-bit lines are 1-bit wide. The adder system 100 also includes a carry-in signal line 155, which may originate from another device or adder system, an output signal line 185, 188, 191, 194 representing the least significant digit of the added m-bit input signals, and a carry forward line of the adder system representing a 1-bit carry from the adder system.

The first n-bit input lines 130, 136, 142, 148 and the second n-bit input lines 133, 139, 145, 151 are each coupled to the respective adder circuit block 110, 115, 120, 125. Also, each n-bit high-sum line 220a–h, 230a–h, 240a–h, 250a–h, n-bit low-sum line 225a–h, 235a–h, 245a–h, 255a–h, m-bit carry-high line 260h, 280h, 270h, 290h, and m-bit carry-low line 265h, 275h, 285h, 295h is coupled to the respective adder circuit block 110, 120, 130, 240.

The n-bit sum-high line 220a–h, 230a–h, 240a–h, 250a–h and the n-bit sum-low line 225a–h, 235a–h, 245a–h, 255a–h of each adder circuit block 110, 115, 120, 125 are coupled to the respective sum output selection switch 160, 166, 172, 178. Each sum output selection switch 160, 166, 172, 178 is coupled to a respective output signal line 185, 188, 191, 194. Each output signal line 185, 188, 191, 194 is n-bits wide and produces the least significant digit of the added input signals represented as n-bit signals along the input signal lines 130a–h, 133a–h, 136a–h, 139a–h, 142a–h, 145a–h, 148a–h, 151a–h into the respective adder circuit block 110, 115, 120, 125. As discussed above, n is 8 in the present adder system 100. Each carry-high line 260h, 270h, 280h, 290h and each carry-low line 265h, 275h, 285h, 295h are coupled to the respective carry selection switch 163, 169, 175, 181. Each carry selection switch 163, 169, 175, except the last carry selection switch 181, is coupled to a carry-forward signal line 199a–c that, in turn, is coupled to the sum selection switch and the carry selection switch of the proceeding adder circuit block. The last carry selection switch 181 is coupled to a carry-forward signal line 199d that is output from the adder system 100.

The carry-in signal line 155 provides a logic high (high=1) or a logic low (low=0) signal to toggle the sum output selection switch 160 of the adder circuit block 110 between the n-bit high-sum line 220a–h and the n-bit low-sum line 225a–h. If the carry-in signal along the carry-in line 155 is high, then the n-bit high-sum line 220a–h is enabled, and if the carry-in signal along the carry-in line 155 is low, then the n-bit low-sum line 225a–h is enabled. Similarly, if the carry-in signal along the carry-in line 155 is high, the carry selection switch 163 enables the carry-high line 260h of the first adder circuit block 110 and if the carry-in signal along the carry-in line 155 is low, the carry selection switch 163 enables the carry-low line 265h of the first adder circuit block 110.

The output signal along the signal output line 185 of the first block is the sum output signal along the sum lines 220a–h, 225a–h to which the sum selection switch is coupled. The output signal produced along the signal output line 185 is the least significant bit of the added signals from the input signals along the n-bit first input line 130a–h and the n-bit second input line 133a–h in the first adder circuit block 110. The input signals along the first n-bit input line 130a–h and the second n-bit input line 133a–h are also used to determine whether a carry signal will be produced along the carry-high line 260h or the carry-low line 265h as further described below in FIG. 2.

Based on the value of the carry-in signal along the carry-in signal line 155, the carry selection switch couples to either the carry-high line 260h or the carry-low line 265h of the first adder circuit block 110. For example, if the signal along the carry-in signal line 155 is high, then the carry selection switch 163 of the first adder circuit block 110 couples to the carry-high line 260h. The signal along the carry-high line 260h is transmitted across the carry-forward line 199a to the sum selection switch 166 and the carry selection switch 169 of the second adder circuit block 115.

If the value of the carry signal from the carry-high line 260 along the carry-forward line 199a is high, then the sum selection switch couples to the n-bit high-sum line 230a–h of the second adder circuit block 115, and the carry selection switch couples to the m-bit carry-high line 270h of the second adder circuit block 115. By contrast, if the carry signal along the carry-high line 260h of the first adder circuit block 110 and the carry-forward signal line 199a is low, then the sum selection switch 166 of the second adder circuit block 115 is coupled to the low-sum line 235a–h, and the carry selection switch 169 of the second adder circuit block 115 is coupled to the carry-low line 275h of the second adder circuit block 115.

Similarly, based on analogous couplings and signal flows as described for the first and second adder block subsystems 102a, 102b, the sum selection switches 172, 178 and the carry selection switches 175, 181 of the subsequent adder block subsystems 102c, 102d are accordingly coupled. Further, the carry selection switch 181 of the fourth adder circuit block 125 is coupled to the carry-forward signal line 199d that is output from the adder system 100 and which may couple to another circuit such as another adder system. The operation of the adder system 100 will be further described below.

Figure 2:
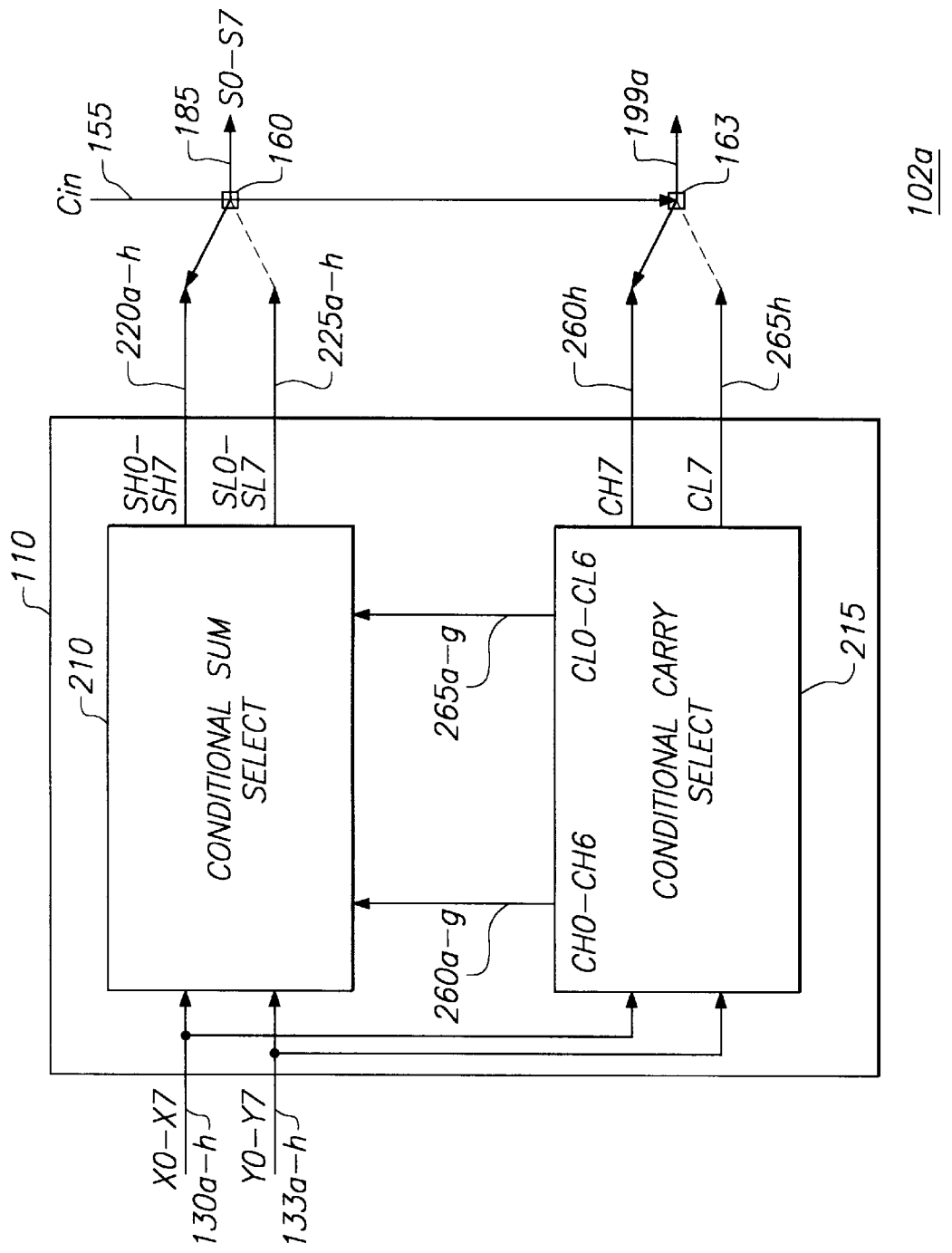
FIG. 2 is a block diagram of an adder circuit block in accordance with the present invention.

Turning now to FIG. 2, a block diagram illustrates the first adder block subsystem 102a of the adder system 100 in accordance with the present invention. For purposes of illustration, FIG. 2 is described with respect to the first adder block subsystem 102a of FIG. 1 and the principles described herein further apply to the second, third, and fourth adder block subsystems 102b–d illustrated in FIG. 1, with differences noted where applicable.

As discussed above, the adder circuit block 110 includes a conditional sum-select block 210 and a conditional carry-select block 215, each of which is further described below in FIGS. 3 and 4, respectively. The first and the second n-bit input lines 130a–h, 133a–h are each coupled to the conditional sum-select block 210 and the conditional carry-select block 215. Further, the n-bit high-sum line 220 and the n-bit low-sum line 225 are coupled to conditional sum-select block 210. In addition, the carry-high line 260h and the carry-low line 265h are coupled to the conditional carry-select block 215.

The conditional carry-select block 215 is coupled to the conditional sum-select block 210 through carry-high lines 260a–g and carry-low lines 265a–g. Both the conditional carry-high lines 260a–g and the conditional carry-low lines 265a–g are n–1 bits in width. The nth carry-high line 260h and the nth carry-low line 265h are 1-bit lines output from the adder circuit block 110 to which the carry selection switch 163 selectively couples. As described above, n is 8 in the adder system 100 so that there are seven 1-bit carry-high lines 260a–g and 1-bit carry-low lines 265a–g from the conditional carry-select 205 to the conditional sum-select 210. The eighth bit of each line is the carry-high line 260h and the carry-low line 265h that selectively couples with the carry selection switch 163.

As a first n-bit input signal enters along the first n-bit input line and a second n-bit input signal enters along a second n-bit input line, both input signals are fed into the conditional sum-select block 210 and the conditional carry-select block 215 simultaneously. The conditional sum-select block 210, further described below in FIG. 3, adds the first n-bit input signal and the second n-bit input signal together to generate an n-bit representation of the least significant digit of the sum of the digits represented by the first and the second n-bit input signals. The conditional carry-select 215, further described in FIG. 4, produces carry-forward signals for producing the carry signal for the subsequent adder block subsystem, e.g., 102b, or for another device if there are no more adder block subsystems 102b–d.

Figure 3:
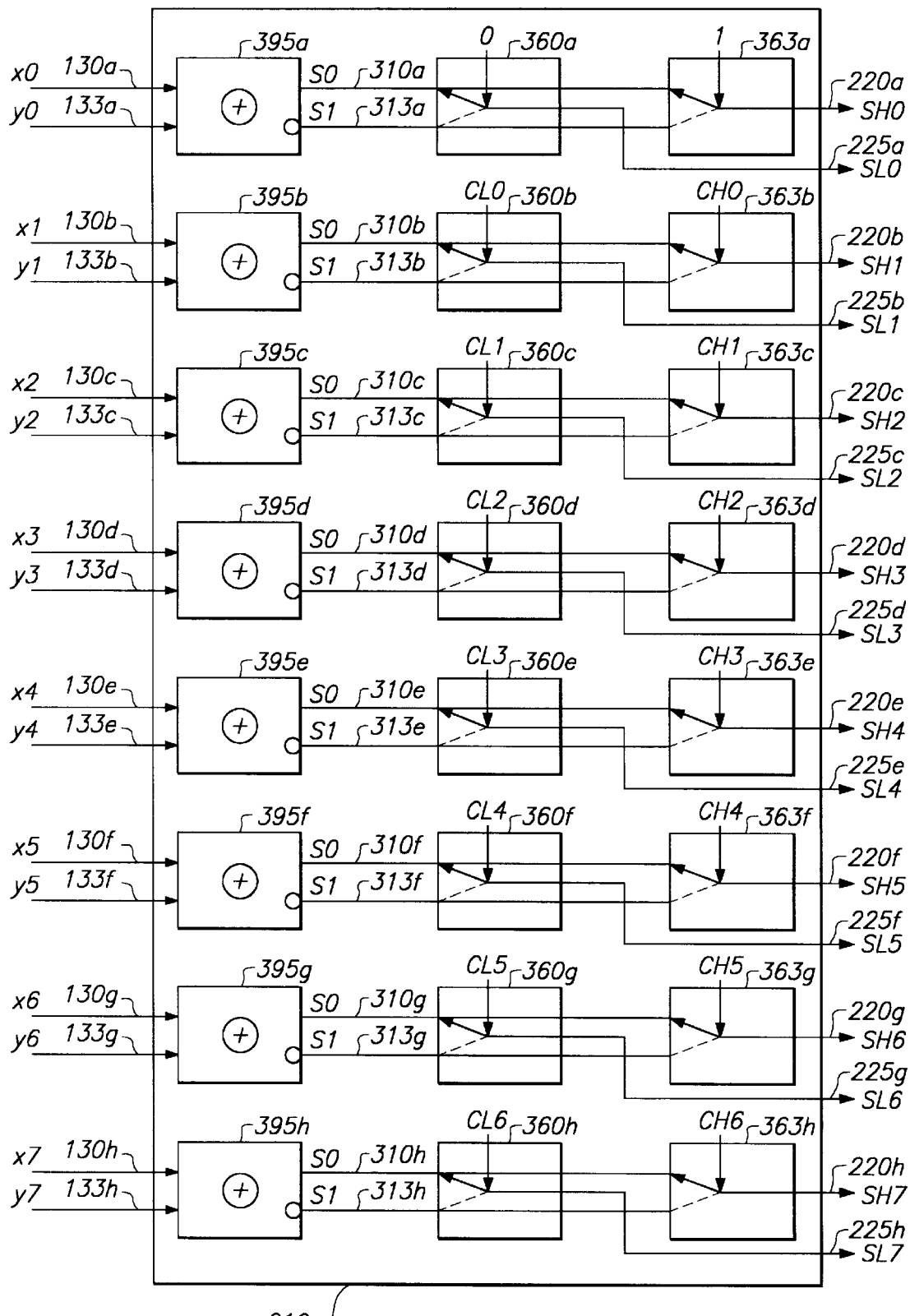
FIG. 3 is a block diagram of a conditional sum select of an adder block in accordance with the present invention.

Referring now to FIG. 3, a block diagram illustrates the conditional sum-select block 210 of the first adder circuit block subsystem 102a in accordance with the present invention. FIG. 3 illustrates the first and the second n-bit input lines 130a–h, 133a–h as individual 1-bit bit input lines, specifically as eight 1-bit input lines 130a–130h, 133a–133h for an 8-bit input signal. Similarly, the sum-high line 220a–h and the sum-low line 225a–h are illustrated as individual bit lines, specifically as eight 1-bit sum output lines 220a–h, 225a–h for an 8-bit output signal.

The conditional sum-select block 210 includes for each pair of first and second bits 130a–h, 133a–h includes a logic adder 395a–h, a pair of logic adder sum out lines 310a–h, 313a–h, a first switch multiplexer 360a–h, a second switch multiplexer 363a–h, a 1-bit carry-high line 260a–h, and a 1-bit carry-low line 265a–h. In a preferred embodiment, the logic adders 395a–h are commercially available logic half-adders. The first and the second switch multiplexers 310a–331a, 310b–331b are implemented using commercially available transistors although conventional multiplexer circuits may also be used.

The couplings for the conditional sum-select block 210 are described with reference to a first adder series subsystem that includes the first pair of 1-bit input lines 130a, 133a, one from the first n-bit input line 130 and one from the second n-bit input line 133, beginning with the least significant bit. That is, one bit from each of the first and the second set of input bits are paired together beginning with the least significant bits and moving to the most significant bits.

The first pair of input bit lines 130a, 133a are coupled to the logic adder 395a. The logic adder 395a is coupled to a first logic adder sum out line 310a and a second logic adder sum out line 313a. The second logic adder sum out line 313a provides an inverted logic adder sum signal from the logic adder 395a versus the logic adder sum signal from the logic adder 395a along the first logic adder sum out line 310a. The first and the second logic adder sum out lines 310a, 313a are coupled to the first multiplexer switch 360a and the second multiplexer switch 363a. It is understood that similar couplings are applicable for each subsequent adder series subsystem following those of the least significant bits as described herein.

The first multiplexer switch 360a is coupled to the sum-low line 225a, while the second multiplexer switch 363a is coupled to the sum-high line 220a. Further, a fixed logic low signal line is coupled to the fist multiplexer switch 360a and a fixed logic high signal line is coupled to the second multiplexer switch 363a. It is noted that for each subsequent adder series subsystem, the first multiplexer switch 360b–h is coupled to a carry-low line 265a–g, and the second multiplexer switch is coupled to a carry-high line 260a–g.

The carry signals along the carry-low lines 265a–g and the carry-high lines 260a–g are representative of a carry signal from the two bit signals added from the previous adder series subsystem. For example, the first multiplexer switch in the second adder series subsystem that includes an input bit signal of the second least significant bit of the first and the second n-bit input signal is coupled to the carry-low line 265a that carries a carry signal derived from a set of logic operations performed using the 1-bit input signal of the least significant bits of the first and the second n-bit input signal that entered the previous adder series subsystem. Similarly, the second multiplexer switch 363b is coupled to the carry-high line 260a that carries a carry signal representative of another set of logic operations involving the least significant bit of the first and the second n-bit input signal. The logic operations generating the carry signals for the carry-high lines 260a–h and the carry-low lines 265a–h are further described with respect to FIG. 4.

Operation of the conditional sum-select block 210 will be generally discussed with reference to the first adder series subsystem and the second adder series subsystem described above. It is to be understood that the operation is similar for each subsequent adder series subsystem.

The least significant bit of each of the first n-bit input signal and the second n-bit input signal enters the logic adder 395a of the first adder series subsystem along the respective 1-bit input lines 130a, 133a. The logic adder 395a sums the two 1-bit input signals that entered along the respective 1-bit input lines 130a, 133a by performing a logic exclusive OR (XOR) function on the two 1-bit input signals. The result of the XOR function in the logic adder 395a is a resultant logic signal output along the first logic adder sum out line 310a and the inverse of the resultant logic signal of the XOR function in the logic adder 395 is output along the second logic adder sum out line 313a.

If the first multiplexer switch 360a is tied to a logic low signal, the first multiplexer switch 360a is coupled to the first logic adder sum out line 310a, and the signal along the sum-low line 225b is the resultant logic signal of the XOR function in the logic adder 395a. If the first multiplexer switch 360b is tied to a logic high signal, the first multiplexer switch 360b is coupled to the second logic adder sum out line 313a and the signal, along the sum-low line 225b is the inverse of the resultant logic signal of the XOR function in the logic adder 395a. Likewise, if the second multiplexer switch 363a is tied to a logic high signal, the second multiplexer switch 363a is coupled to the second logic adder sum out line 313a, and the signal along the sum-high line 220a is the inverse resultant logic signal of the XOR function in the logic adder 395a. If the second multiplexer switch 363a is tied to a logic low signal, the second multiplexer switch 363a is coupled to the first logic adder sum out line 310a, and the signal along the high-sum line 220a is the resultant logic signal of the XOR function in the logic adder 395a.

The second adder series subsystem, which uses the second least significant bit signals from each of the first n-bit input signal and the second n-bit input signal, operates similar to the first adder series subsystem except that the first and second multiplexer switches 360b, 363b operate based on carry signals along the 1-bit carry-low line 265a and 1-bit carry-high line 260a, respectively. As described above, the carry signal along the 1-bit carry-low line 265a and the carry signal along the 1-bit carry-high line 260a are a result of a logic operation between the two 1-bit signals in the conditional carry-select 215 of the previous adder series subsystem. The logic operation will be further described in FIG. 4.

Figure 4:
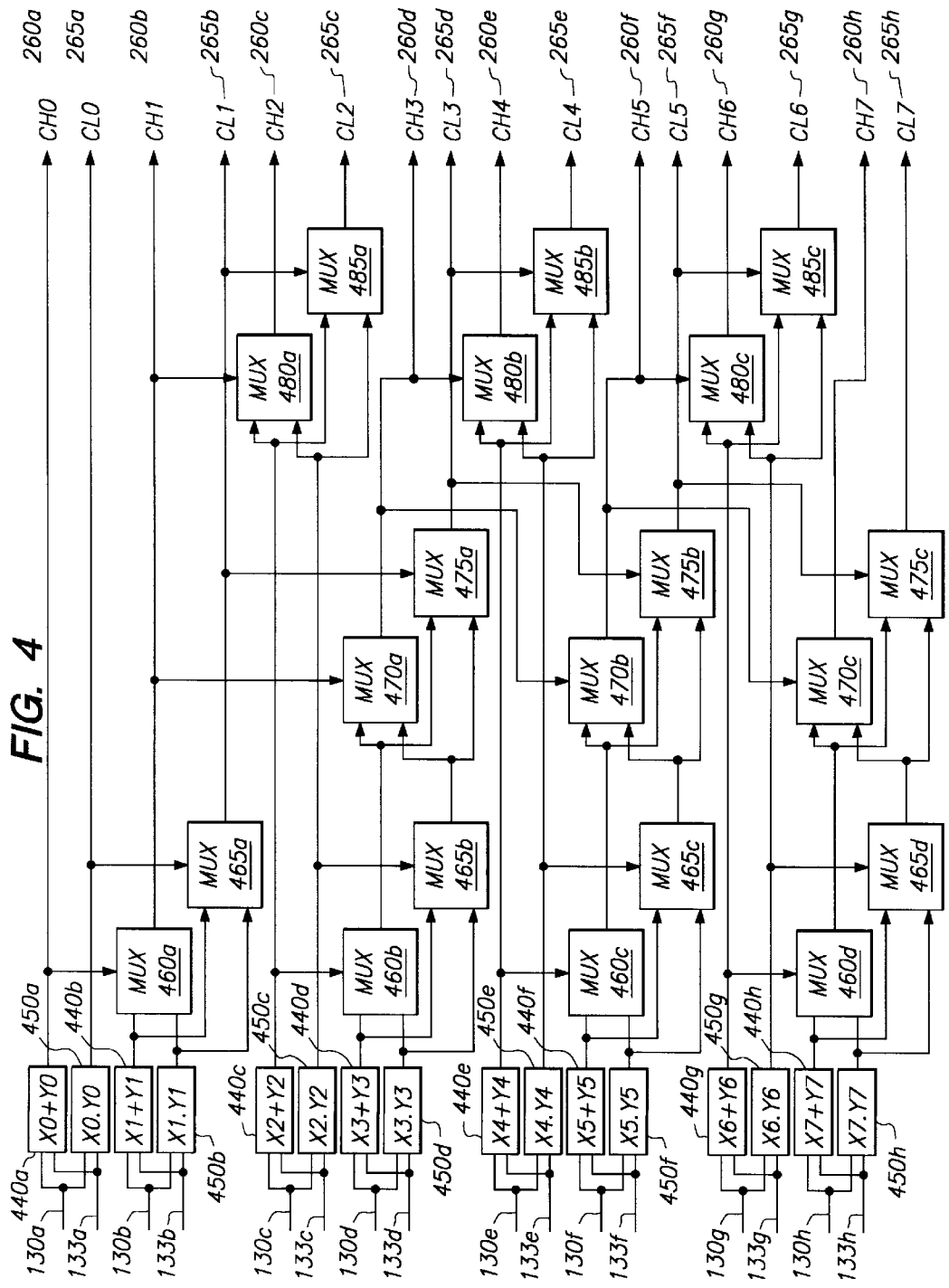
FIG. 4 is a block diagram of a conditional carry select of an adder block in accordance with the present invention.

Turning now to FIG. 4, a block diagram illustrates a conditional carry-select that is included in each adder circuit block 110, 115, 120, 125 in accordance with the present invention. The conditional carry-select 215 will be described with respect to the first adder circuit block 110. It is understood that the structure and operation of the conditional carry-select 215 are similar in the remaining adder blocks 115, 120, 125.

The conditional carry-select 215 includes the first and the second n-bit input lines 130, 133 as individual 1-bit input lines, specifically as 1-bit input lines 130a–h, 133a–h of an 8-bit wide input line for 8-bit input signal as described in FIG. 3. The conditional carry-select 215 also includes logic OR subcircuits 440a–h and logic AND subcircuits 450a–h, a first set of line multiplexers 460a–d, a second set of line multiplexers 465a–d, a third set of line multiplexers 470a–c, a fourth set of line multiplexers 475a–c, a fifth set of line multiplexers 480a–c, and a sixth set of line multiplexers 485a–c. The conditional carry-select 215 also includes the carry-high line 260 and the carry-low line 265 which are illustrated as individual bit lines, specifically as 1-bit signal lines 260a–h, 265a–h.

Each 1-bit input line 130a–h, 133a–h is coupled to a respective logic OR subcircuit 440a–h and a logic AND subcircuit 450a–h. For example, the least significant 1-bit input lines 130a, 133a of the first n-bit input line 130 and the second n-bit input line 133 are each coupled to the first logic OR subcircuit 440a and the first logic AND subcircuit 450a.

Similarly, the second least significant 1-bit input lines 130b, 133b of the first n-bit input line 130 and the second n-bit input line 133 are each coupled to the second logic OR subcircuit 440b and the second logic AND subcircuit 450b. Each subsequent set of 1-bit input lines 130c–g, 133c–g from the first n-bit input line 130 and the second n-bit input line 133 are each coupled to the third through seventh logic OR subcircuits 440c–g, respectively, and the third through seventh logic AND subcircuits 450c–g, respectively, until the most significant 1-bit input lines 130h, 133h, which are coupled to the eighth logic OR subcircuit 440h and the eighth 450h logic AND subcircuit 450a.

The output of the first logic OR subcircuit 440a is coupled to the least significant 1-bit carry-high line 260a and the first line multiplexer 460a of the first set of line multiplexers 460a–d. The output of the first logic AND subcircuit 450a is coupled to the least significant 1-bit carry-low line 265a and the first line multiplexer 465a of the second set of line multiplexers 465a–d. The output of the second logic OR subcircuit 440b is coupled to the first line multiplexer 460a of the first set of line multiplexers 460a–d, and the first line multiplexer 465a of the second set of line multiplexers 465a–d. The output of the second logic AND subcircuit 450b is coupled to the first line multiplexer 460a of the first set of line multiplexers 460a–d, and the first line multiplexer 465a of the second set of line multiplexers 465a–d.

The output of the first line multiplexer 460a of the first set of line multiplexers 460a–d is coupled to the second least significant 1-bit carry-high line 260b, the first line multiplexer 470a of the third set of line multiplexers 470a–c, and the first line multiplexer 480a of the fifth set of line multiplexers 480a–c. The output of the first line multiplexer 465a of the second set of line multiplexers 465a–d is coupled to the second least significant 1-bit carry-low line 265b, the first line multiplexer 475a of the fourth set of line multiplexers 475a–c, and the first line multiplexer 485a of the sixth set of line multiplexers 485a–c.

The output of the third logic OR subcircuit 440c is coupled to the second line multiplexer 460b of the first set of line multiplexers 460a–d, the first line multiplexer 480a of the fifth set of line multiplexers 480a–c, and the first line multiplexer 485a of the sixth set of line multiplexers 485a–c. The output of the third logic AND subcircuit 450c is coupled to the second line multiplexer 465b of the second set of line multiplexers 465a–d, the first line multiplexer 480a of the fifth set of line multiplexers 480a–c and the first line multiplexer 485a of the sixth set of line multiplexers 485a–c.

The output of the first line multiplexer 480a of the fifth set of line multiplexers 480a–c is coupled to the third least significant 1-bit carry-high line 260b. The output of the first line multiplexer 485a of the sixth set of line multiplexers 485a–c is coupled to the third least significant 1-bit carry-low line 265b.

The output of the fourth logic OR subcircuit 440b is coupled to the second line multiplexer 460b of the first set of line multiplexers 460a–d and the second line multiplexer 465b of the second set of line multiplexers 465a–d. The output of the fourth logic AND subcircuit 450d is coupled to the second line multiplexer 460b of the first set of line multiplexers 460a–d and the second line multiplexer 465b of the second set of line multiplexers 465a–d. The output of the second line multiplexer 460b of the first set of line multiplexers 460a–d is coupled to the first line multiplexer 470a of the third set of line multiplexers 470a–c and the first line multiplexer 475a of the fourth set of line multiplexers 475*a–c*. The output of the second line multiplexer 465*b* of the second set of line multiplexers 465*a–d* is coupled to the first line multiplexer 470*a* of the third set of line multiplexers 470*a–c* and the first line multiplexer 475*a* of the fourth set of line multiplexers 475*a–c*.

The output of the first line multiplexer 470*a* of the third set of line multiplexers 470*a–c* is coupled to the fourth least significant 1-bit carry-high line 260*d*, the second line multiplexer 470*b* of the third set of line multiplexers 470*a–c*, and the second line multiplexer 480*b* of the fifth set of line multiplexers 480*a–c*. The output of the first line multiplexer 475*a* of the fourth set of line multiplexers 475*a–c* is coupled to the fourth least significant 1-bit carry-low line 265*d*, the second line multiplexer 475*b* of the fourth set of line multiplexers 475*a–c*, and the second line multiplexer 485*b* of the sixth set of line multiplexers 485*a–c*.

The output of the fifth logic OR subcircuit 440*e* is coupled to the second line multiplexer 480*b* of the fifth set of line multiplexers 480*a–c* and the second line multiplexer 485*a* of the sixth set of line multiplexers 485*a–c*. The output of the fifth logic AND subcircuit 450*e* is coupled to the second line multiplexer 480*b* of the fifth set of line multiplexers 480*a–c* and the second line multiplexer 485*b* of the second set of line multiplexers 485*a–c*. The output of the second line multiplexer 480*b* of the fifth set of line multiplexers 480*a–c* is coupled to the fifth least significant 1-bit carry-high line 260*e*. The output of the second line multiplexer 485*a* of the sixth set of line multiplexers 485*a–c* is coupled to the fifth least significant 1-bit carry-low line 265*e*.

The output of the sixth logic OR subcircuit 440*f* is coupled to the third line multiplexer 460*c* of the first set of line multiplexers 460*a–d* and the third line multiplexer 465*c* of the second set of line multiplexers 465*a–d*. The output of the sixth logic AND subcircuit 450*f* is coupled to the third line multiplexer 460*c* of the first set of line multiplexers 460*a–d* and the third line multiplexer 465*c* of the second set of line multiplexers 465*a–d*. The output of the third line multiplexer 460*c* of the first set of line multiplexers 460*a–d* is coupled to the second line multiplexer 470*d* of the third set of line multiplexers 470*a–c* and the second line multiplexer 475*b* of the fourth set of line multiplexers 475*a–c*. The output of the third line multiplexer 465*c* of the second set of line multiplexers 465*a–d* is coupled to the second line multiplexer 470*b* of the third set of line multiplexers 470*a–c* and the second line multiplexer 475*b* of the fourth set of line multiplexers 475*a–c*.

The output of the second line multiplexer 470*b* of the third set of line multiplexers 470*a–c* is coupled to the sixth least significant 1-bit carry-high line 260*f*, the third line multiplexer 470*c* of the third set of line multiplexers 470*a–c*, and the third line multiplexer 480*c* of the fifth set of line multiplexers 480*a–c*. The output of the second line multiplexer 475*b* of the fourth set of line multiplexers 475*a–c* is coupled to the sixth least significant 1-bit carry-low line 265*f*, the third line multiplexer 475*c* of the fourth set of line multiplexers 475*a–c*, and the third line multiplexer 485*c* of the sixth set of line multiplexers 485*a–c*.

The output of the seventh logic OR subcircuit 440*g* is coupled to the fourth line multiplexer 460*d* of the first set of line multiplexers 460*a–d*, the third line multiplexer 480*c* of the fifth set of line multiplexers 480*a–c*, and the third line multiplexer 485*c* of the sixth set of line multiplexers 485*a–c*. The output of the seventh logic AND subcircuit 450*g* is coupled to the fourth line multiplexer 465*d* of the second set of line multiplexers 465*a–d*, third line multiplexer 480*c* of the fifth set of line multiplexers 480*a–c*, and the third line multiplexer 485*c* of the sixth set of line multiplexers 485*a–c*. The output of the third line multiplexer 480*c* of the fifth set of line multiplexers 480*a–c* is coupled to the second most significant 1-bit carry-high line 260*g* of the n-bit carry-high line 260. The output of the third line multiplexer 485*c* of the sixth set of line multiplexers 485*a–c* is coupled to the second most significant 1-bit carry-low line 265*b* of the n-bit carry-low line 265.

The output of the eighth logic OR subcircuit 440*h* is coupled to the fourth line multiplexer 460*d* of the first set of line multiplexers 460*a–d* and the fourth line multiplexer 465*d* of the second set of line multiplexers 465*a–d*. The output of the eighth logic AND subcircuit 450*h* is coupled to the fourth line multiplexer 460*d* of the first set of line multiplexers 460*a–d* and the second line multiplexer 465*d* of the second set of line multiplexers 465*a–d*. The output of the fourth line multiplexer 460*d* of the first set of line multiplexers 460*a–d* is coupled to the third line multiplexer 470*c* of the third set of line multiplexers 470*a–c* and the third line multiplexer 475*c* of the fourth set of line multiplexers 475*a–c*. The output of the third line multiplexer 470*c* of the third set of line multiplexers 470*a–c* is coupled to the most significant 1-bit carry-high line 260*d* of the n-bit carry-high line 260. The output of the third line multiplexer 475*c* of the fourth set of line multiplexers 475*a–c* is coupled to the most significant 1-bit carry-low line 265*d* of the n-bit carry-low line 265.

The conditional carry-select 215 of the present invention offers an advantage of minimizing circuit elements to reduce carry bit propagation delays. Further, the conditional carry-select 215 offers a benefit of selectively enabling particular line multiplexers so that there are only four propagation delays, for example, between the 1-bit input signal into the conditional sum-select 215 and the 1-bit output signal based on the line multiplexers enabled. Therefore, the conditional carry-select 215 increases circuit operation in the adder system 100 because the overall propagation delay within the adder block subsystems 102*a–d* are reduced.

Figure 5:
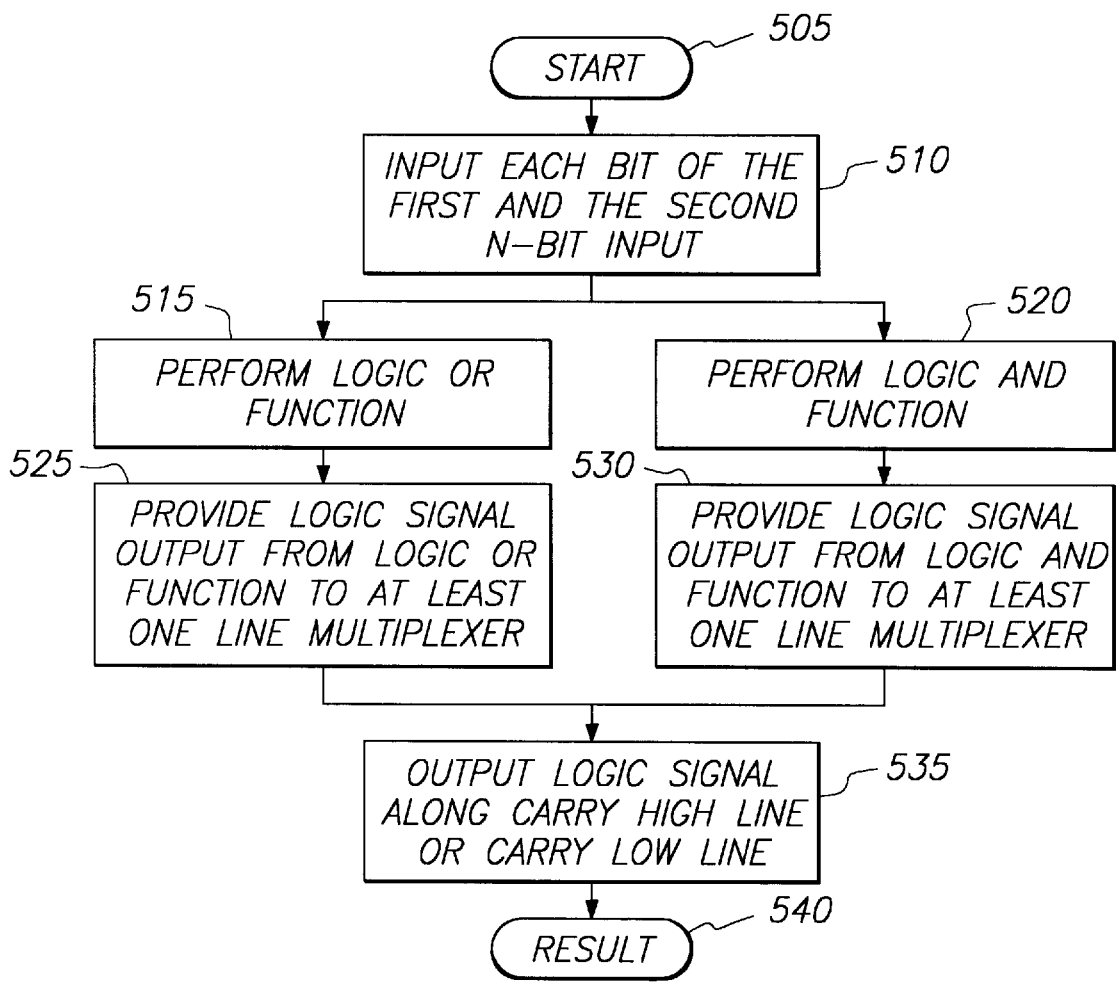
FIG. 5 is a flow diagram illustrating operation of the conditional carry select block in accordance with the present invention.

Operation of the conditional carry-select 215 can be described through FIGS. 4 and 5. Once the process starts 505, the least significant bit of each of the first and the second n-bit input signal is input 510 along the respective least significant 1-bit input lines 130*a*, 133*a* of the first and the second n-bit input lines 130, 133. The least significant bits of the first and the second n-bit input signals are input into the first logic OR subcircuit 440*a* and the first logic AND subcircuit 450*a*. The first logic OR subcircuit 440*a* generates a logic high or a logic low signal based on the result of the logic OR function performed 515 on the two bits input into the logic OR subcircuit 440*a*. Likewise, the first logic AND subcircuit 450*a* generates a logic high or a logic low signal based on the result of the logic AND function 520 performed on the two bits input into the logic AND subcircuit 450*a*.

The following table illustrates the OR function performed in the logic OR subcircuits 440*a–h* and the AND function performed in the logic AND blocks 450*a–h*, based on the 1-bit inputs from the first and the second n-bit input signals entering the logic OR subcircuit 440*a–h* and the logic AND subcircuit 450*a–h* along the respective 1-bit input lines 130*a–h*, 133*a–h*.

| Logic OR and Logic AND functions | | | |
|---|---|---|---|
| 1-bit input from the first n-bit input signal | 1-bit input from the second n-bit input signal | Logic OR function (X + Y) in logic OR subcircuit | Logic AND function (X · Y) in logic AND subcircuit |
| 0 | 0 | 0 | 0 |
| 0 | 1 | 1 | 0 |
| 1 | 0 | 1 | 0 |
| 1 | 1 | 1 | 1 |

If the output signal from the first logic OR subcircuit 440a is a logic low, the logic signal provided 525, 535 along the least significant carry-high line 260a is a logic low and the first line multiplexer 460a of the first set of line multiplexers 460a–d is switched to select the output of the second logic OR subcircuit 440b. If the output signal from the first logic OR subcircuit 450a is a logic high, the logic signal provided 525, 535 along the least significant carry-high line 260a is a logic high and the first line multiplexer 460a of the first set of line multiplexers 460a–d is switched to select the output of the second logic AND subcircuit 450b.

Similarly, if the output signal from the first logic AND subcircuit 440a is a logic low, the logic signal provided 525, 535 along the least significant carry-low line 265a is a logic low and the first line multiplexer 465a of the second set of line multiplexers 465a–d is switched to select the output of the second logic OR subcircuit 440b. Thus, the output along the second least significant 1-bit carry-high line 260b will be the logic signal of the output of the second logic OR subcircuit 440b or the logic signal of the output of the second logic AND subcircuit 450b depending on the logic output from the first logic OR subcircuit 440a.

If the output signal from the first logic AND subcircuit 440a is a logic high, the logic signal provided 525, 535 along the least significant carry-low line 265a is a logic high and the first line multiplexer 465a of the second set of line multiplexers 465a–d is switched to select the output of the second logic AND subcircuit 450b. Thus, the output along the second least significant 1-bit carry-low line 265b will be the logic signal of the output of the second logic OR subcircuit 440b or the logic signal of the output of the second logic AND subcircuit 450b depending on the logic output from the first logic AND subcircuit 450a.

The logic signal passing through the first line multiplexer 460a of the first set of line multiplexers 460a–d is also used to switch the first line multiplexer 470a of the third set of line multiplexers 470a–c and the first line multiplexer 480a of the fifth set of line multiplexers 480a–c. If the logic signal provided 525 to the first line multiplexer 460a of the first set of line multiplexers 460a–d is a logic high, the logic signal passing through the first line multiplexer 480a of the fifth set of line multiplexers 480a–c is the output of the logic signal from the third logic OR subcircuit 440c, which will be the logic signal output along the third least significant 1-bit carry-high line 260c. If the logic signal provided 525 to the first line multiplexer 460a of the first set of line multiplexers 460a–d is a logic low, the logic signal passing through the first line multiplexer 480a of the fifth set of line multiplexers 480a–c is the output of the logic signal from the third logic AND subcircuit 450c, which will be the logic signal output along the third least significant 1-bit carry-high line 260c.

The logic signal passing through the first line multiplexer 465a of the second set of line multiplexers 465a–d is also used to switch the first line multiplexer 475a of the fourth set of line multiplexers 475a–c and the first line multiplexer 485a of the sixth set of line multiplexers 485a–c. If the logic signal to the first line multiplexer 465a of the second set of line multiplexers 465a–d is a logic high, the logic signal passing through the first line multiplexer 485a of the sixth set of line multiplexers 485a–c is the output of the logic signal from the third logic OR subcircuit 440c, which will be the logic signal output along the third least significant 1-bit carry-low line 265c. If the logic signal to the first line multiplexer 465a of the second set of line multiplexers 465a–d is a logic low, the logic signal passing through the first line multiplexer 485a of the sixth set of line multiplexers 485a–c is the output of the logic signal from the third logic AND subcircuit 450c, which will be the signal output along the third least significant 1-bit carry-low line 265c.

The logic signal output from the third logic OR subcircuit 440c is also passed to the second line multiplexer 460b of the first set of line multiplexers 460a–d. If the logic signal output from the third logic OR subcircuit 440c is a logic high, the second line multiplexer 460b of the first set of line multiplexers 460a–d is coupled to pass the output of the fourth logic OR subcircuit 440d. If the logic signal output from the third logic OR subcircuit 440c is a logic low, the second line multiplexer 460b of the first set of line multiplexers 460a–d is coupled to pass the output of the fourth logic AND subcircuit 450d.

Similarly, the logic signal output from the third logic AND subcircuit 450c is also passed to the second line multiplexer 465b of the second set of line multiplexers 465a–d. If the logic signal output from the third logic AND subcircuit 450c is a logic high, the second line multiplexer 465b of the second set of line multiplexers 465a–d is coupled to pass the output of the fourth logic OR subcircuit 440d. If the logic signal output from the third logic AND subcircuit 450c is a logic low, the second line multiplexer 465b of the second set of line multiplexers 465a–d is coupled to pass the output of the fourth logic AND subcircuit 450d.

The logic signal passing through the first line multiplexer 470a of the third set of line multiplexers 470a–c onto the fourth least significant 1-bit carry-high line 260d, the second line multiplexer 470b of the third set of line multiplexers 470a–c, and the second multiplexer 480b of the fifth set of line multiplexers 480a–c is dependent upon the logic signal passing through the first line multiplexer 460a of the first set of line multiplexers 460a–d. If the logic signal from the first line multiplexer 460a of the first set of line multiplexers 460a–d into the first line multiplexer 470a of the third set of line multiplexers 470a–c is a logic high, the logic signal through first line multiplexer 470a of the third set of line multiplexers 470a–c is the logic signal passing through the second line multiplexer 460b of the first set of line multiplexers 460a–d. If the logic signal from the first line multiplexer 460a of the first set of line multiplexers 460a–d into the first line multiplexer 470a of the third set of line multiplexers 470a–c is a logic low, the logic signal passing through first line multiplexer 470a of the third set of line multiplexers 470a–c is the logic signal passing through the second line multiplexer 465b of the second set of line multiplexers 465a–d.

The logic signal passing through the first line multiplexer 475a of the fourth set of line multiplexers 475a–c onto the fourth least significant 1-bit carry-low line 265d, the second line multiplexer 475b of the fourth set of line multiplexers 475a–c, and the second multiplexer 485b of the sixth set of line multiplexers 485a–c is dependent upon the logic signal passing through the first line multiplexer 465a of the second set of line multiplexers 465*a–d*. If the logic signal from the first line multiplexer 465*a* of the second set of line multiplexers 465*a–d* into the first line multiplexer 475*a* of the fourth set of line multiplexers 475*a–c* is a logic high, the logic signal passing through first line multiplexer 475*a* of the fourth set of line multiplexers 475*a–c* is the logic signal passing through the second line multiplexer 460*b* of the first set of line multiplexers 460*a–d*. If the signal from the first line multiplexer 465*a* of the second set of line multiplexers 465*a–d* into the first line multiplexer 475*a* of the fourth set of line multiplexers 475*a–c* is a logic low, the logic signal passing through first line multiplexer 475*a* of the fourth set of line multiplexers 475*a–c* is the logic signal passing through the second line multiplexer 465*b* of the second set of line multiplexers 465*a–d*.

If the logic signal output from the first line multiplexer 470*a* of the third set of line multiplexers 470*a–c* is a logic high, the second line multiplexer 480*b* of the fifth set of line multiplexers 480*a–c* switches to couple to the output of the fifth logic OR subcircuit 440*e*. If the logic signal from the first line multiplexer 470*a* of the third set of line multiplexers 470*a–c* is a logic low, the second line multiplexer 480*b* of the fifth set of line multiplexers 480*a–c* switches to couple to the output of the fifth logic AND subcircuit 450*e*. Thus, the output of the fifth least significant 1-bit carry-high line 260*e* is dependent upon the logic signal from the first line multiplexer 470*a* of the third set of line multiplexers 470*a–c* and the logic signal output from either the fifth logic OR subcircuit 440*e* or the fifth logic AND subcircuit 450*e*.

Likewise, if the logic signal output from the first line multiplexer 475*a* of the fourth set of line multiplexers 475*a–c* is a logic high, the second line multiplexer 485*b* of the sixth set of line multiplexers 485*a–c* switches to couple to the output of the fifth logic OR subcircuit 440*e*. If the logic signal from the first line multiplexer 475*a* of the fourth set of line multiplexers 475*a–c* is a logic low, the second line multiplexer 485*b* of the sixth set of line multiplexers 485*a–c* switches to couple to the output of the fifth logic AND subcircuit 450*e*. Thus, the output of the fifth least significant 1-bit carry-low line 265*e* is dependent upon the logic signal from the first line multiplexer 475*a* of the fourth set of line multiplexers 475*a–c* and the logic signal output from either the fifth logic OR subcircuit 440*e* or the fifth logic AND subcircuit 450*e*.

The output from the fifth logic OR subcircuit 440*e* is forwarded to the third line multiplexer 460*c* of the first set of line multiplexers 460*a–d*, while the output from the fifth logic AND subcircuit 450*e* is forwarded to the third line multiplexer 465*c* of the second set of line multiplexers 465*a–d*. If the logic signal to the third line multiplexer 460*c* of the first set of line multiplexers 460*a–d* is a logic high, the third line multiplexer 460*c* of the first set of line multiplexers 460*a–d* is switched to receive the output of the sixth logic OR subcircuit 440*f*. If the logic signal to the third line multiplexer 460*c* of the first set of line multiplexers 460*a–d* is a logic low, the third line multiplexer 460*c* of the first set of line multiplexers 460*a–d* is switched to receive and pass the output of the sixth logic AND subcircuit 450*f*.

Similarly, if the logic signal to the third line multiplexer 465*c* of the second set of line multiplexers 465*a–d* is a logic high, the third line multiplexer 465*c* of the second set of line multiplexers 465*a–d* is switched to receive the output of the sixth logic OR subcircuit 440*f*. If the logic signal to the third line multiplexer 465*c* of the second set of line multiplexers 465*a–d* is a logic low, the third line multiplexer 465*c* of the second set of line multiplexers 465*a–d* is switched to receive and pass the output of the sixth logic AND subcircuit 450*f*.

The logic signal passing through the second line multiplexer 470*b* of the third set of line multiplexers 470*a–c* onto to the sixth least significant 1-bit carry-high line 260*f*, the third line multiplexer 470*c* of the third set of line multiplexers 470*a–c*, and the third line multiplexer 480*c* of the fifth set of line multiplexers 480*a–c* is dependent upon the logic signal passing through the first line multiplexer 470*a* of the third set of line multiplexers 470*a–c*. If the logic signal from the first line multiplexer 470*a* of the third set of line multiplexers 470*a–c* into the second line multiplexer 470*b* of the third set of line multiplexers 470*a–c* is a logic high, the logic signal passing through second line multiplexer 470*b* of the third set of line multiplexers 470*a–c* is the logic signal passing through the third line multiplexer 460*c* of the first set of line multiplexers 460*a–d*. If the logic signal from the first line multiplexer 470*a* of the third set of line multiplexers 470*a–c* into the second line multiplexer 470*b* of the third set of line multiplexers 470*a–c* is a logic low, the logic signal passing through second line multiplexer 470*b* of the third set of line multiplexers 470*a–c* is the logic signal passing through the third line multiplexer 465*c* of the second set of line multiplexers 465*a–d*.

The logic signal passing through the second line multiplexer 475*b* of the fourth set of line multiplexers 475*a–c* onto the sixth least significant 1-bit carry-low line 265*f*, the third line multiplexer 475*c* of the fourth set of line multiplexers 475*a–c*, and the third multiplexer 485*c* of the sixth set of line multiplexers 485*a–c* is dependent upon the logic signal passing through the first line multiplexer 475*a* of the fourth set of line multiplexers 475*a–c*. If the logic signal from the first line multiplexer 475*a* of the fourth set of line multiplexers 475*a–c* into the second line multiplexer 475*b* of the fourth set of line multiplexers 475*a–c* is a logic high, the logic signal passing through second line multiplexer 475*b* of the fourth set of line multiplexers 475*a–c* is the logic signal passing through the third line multiplexer 460*c* of the first set of line multiplexers 460*a–d*. If the logic signal from the first line multiplexer 475*a* of the fourth set of line multiplexers 475*a–c* into the second line multiplexer 475*b* of the fourth set of line multiplexers 475*a–c* is a logic low, the logic signal passing through second line multiplexer 475*b* of the fourth set of line multiplexers 475*a–c* is the logic signal passing through the third line multiplexer 465*c* of the second set of line multiplexers 465*a–d*.

If the logic signal output from the second line multiplexer 470*b* of the third set of line multiplexers 470*a–c* is a logic high, the third line multiplexer 480*c* of the fifth set of line multiplexers 480*a–c* switches to couple to the output of the seventh logic OR subcircuit 440*g*. If the logic signal from the second line multiplexer 470*b* of the third set of line multiplexers 470*a–c* is a logic low, the third line multiplexer 480*c* of the fifth set of line multiplexers 480*a–c* switches to couple to the output of the seventh logic AND subcircuit 450*g*. Thus, the output of the second most significant 1-bit carry-high line 260*f* is dependent upon the logic signal from the second line multiplexer 470*b* of the third set of line multiplexers 470*a–c* and the logic signal output from either the seventh logic OR subcircuit 440*g* or the seventh logic AND subcircuit 450*g*.

Likewise, if the logic signal output from the second line multiplexer 475*b* of the fourth set of line multiplexers 475*a–c* is a logic high, the third line multiplexer 485*c* of the sixth set of line multiplexers 485*a–c* switches to couple to the output of the seventh logic OR subcircuit 440*g*. If the logic signal from the second line multiplexer 475*b* of the fourth set of line multiplexers 475*a–c* is a logic low, the third line multiplexer 485*c* of the sixth set of line multiplexers 485*a–c* switches to couple to the output of the seventh logic AND subcircuit 450*g*. Thus, the output of the second most significant 1-bit carry-low line 265*e* is dependent upon the logic signal from the second line multiplexer 475*b* of the fourth set of line multiplexers 475*a–c* and the logic signal output from either the seventh logic OR subcircuit 440*g* or the seventh logic AND subcircuit 450*g*.

The logic signal output from the seventh logic OR subcircuit 440*f* is also passed to the fourth line multiplexer 460*d* of the first set of line multiplexers 460*a–d*. If the logic signal output from the seventh logic OR subcircuit 440*g* is a logic high, the fourth line multiplexer 460*d* of the first set of line multiplexers 460*a–d* is coupled to pass the output of the eighth logic OR subcircuit 440*h*. If the logic signal output from the seventh logic OR subcircuit 440*g* is a logic low, the second line multiplexer 460*d* of the first set of line multiplexers 460*a–d* is coupled to pass the output of the eighth logic AND subcircuit 450*h*.

Further, the logic signal output from the seventh logic AND subcircuit 450*g* is also passed to the fourth line multiplexer 465*d* of the second set of line multiplexers 465*a–d*. If the logic signal output from the seventh logic AND subcircuit 450*g* is a logic high, the fourth line multiplexer 465*d* of the second set of line multiplexers 465*a–d* is coupled to pass the output of the eighth logic OR subcircuit 440*h*. If the logic signal output from the seventh logic AND subcircuit 450*g* is a logic low, the fourth line multiplexer 465*d* of the second set of line multiplexers 465*a–d* is coupled to pass the output of the eighth logic AND subcircuit 450*h*.

The logic signal passing through the third line multiplexer 470*c* of the third set of line multiplexers 470*a–c* onto the most significant 1-bit carry-high line 260*h* is dependent upon the logic signal passing through the second line multiplexer 470*b* of the third set of line multiplexers 470*a–c*. If the logic signal from the second line multiplexer 470*b* of the third set of line multiplexers 470*a–c* into the third line multiplexer 470*b* of the third set of line multiplexers 470*a–c* is a logic high, the logic signal passing through third line multiplexer 470*c* of the third set of line multiplexers 470*a–c* is the logic signal passing through the fourth line multiplexer 460*c* of the first set of line multiplexers 460*a–d*. If the logic signal from the second line multiplexer 470*b* of the third set of line multiplexers 470*a–c* into the third line multiplexer 470*c* of the third set of line multiplexers 470*a–c* is a logic low, the logic signal passing through third line multiplexer 470*c* of the third set of line multiplexers 470*a–c* is the logic signal passing through the fourth line multiplexer 465*d* of the second set of line multiplexers 465*a–d*.

Similarly, the logic signal passing through the third line multiplexer 475*c* of the fourth set of line multiplexers 475*a–c* onto the most significant 1-bit carry-low line 265*h* is dependent upon the logic signal passed through the second line multiplexer 475*a* of the fourth set of line multiplexers 475*a–c*. If the logic signal from the second line multiplexer 475*c* of the fourth set of line multiplexers 475*a–c* into the third line multiplexer 475*c* of the fourth set of line multiplexers 475*a–c* is a logic high, the logic signal passing through the third line multiplexer 475*c* of the fourth set of line multiplexers 475*a–c* is the logic signal passing through the fourth line multiplexer 460*d* of the first set of line multiplexers 460*a–d*. If the logic signal from the second line multiplexer 475*b* of the fourth set of line multiplexers 475*a–c* into the third line multiplexer 475*c* of the fourth set of line multiplexers 475*a–c* is a logic low, the logic signal passing through third line multiplexer 475*c* of the fourth set of line multiplexers 475*a–c* is the logic signal passing through the fourth line multiplexer 465*d* of the second set of line multiplexers 465*a–d*.

The present invention offers an advantage of reducing the number of gate delays from an input of two or more signals to an output of a signal in an adder system having an adder circuit with a carry. The reduction in gate delays increases circuit speed for an addition operation with a carry. Further, a benefit of the present invention is that adder circuits may be cascaded without a significant increase in circuit delays. Therefore, the present invention may advantageously be used in wide-bit adder systems that include circuitry for propagating a carry signal because the adder system would not suffer from a decrease in circuit speed or performance.

Figure 6:
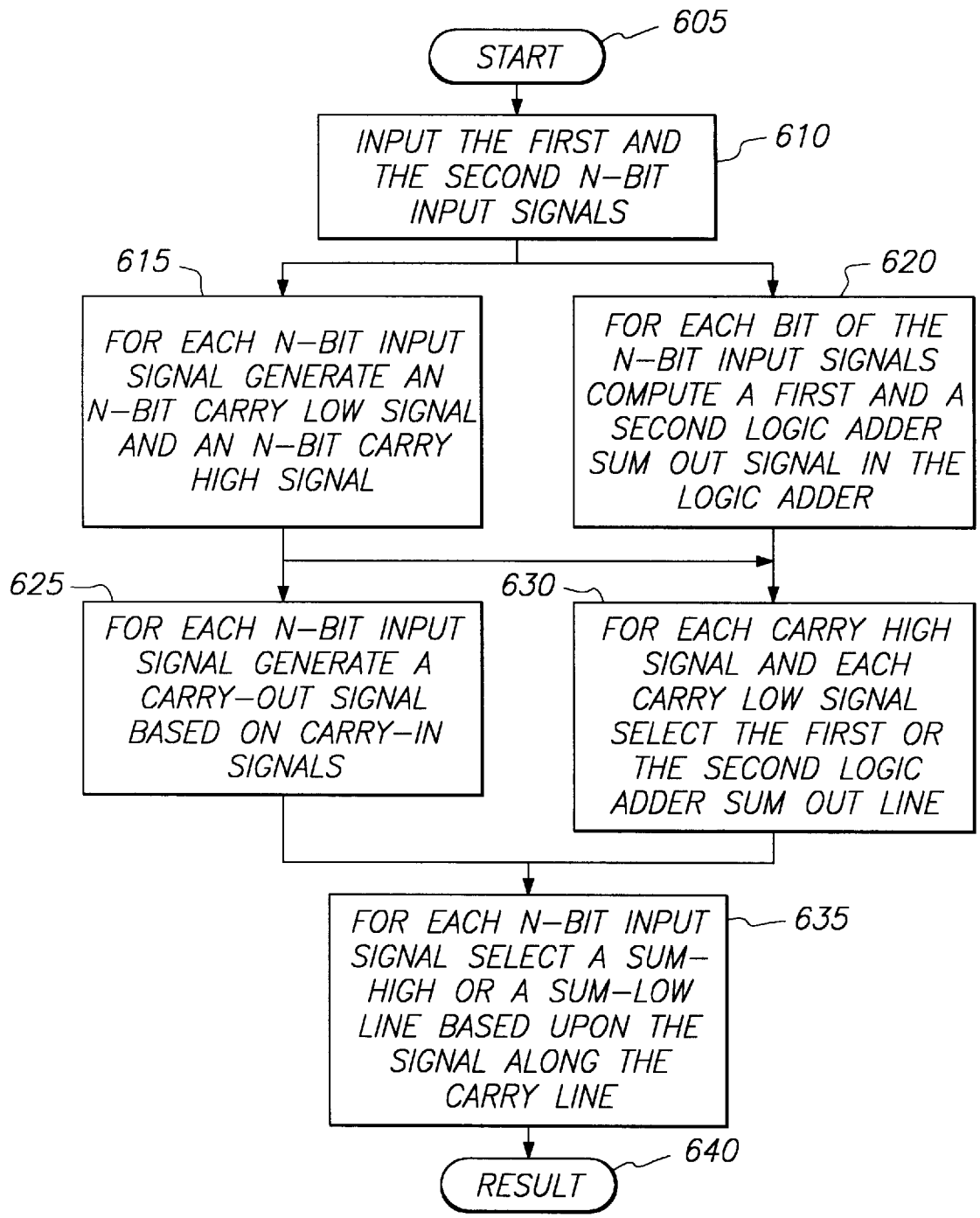
FIG. 6 is a flow diagram illustrating operation of the adder system in accordance with the present invention.

Operation of the adder system 100 will be summarized through FIGS. 1 and 6. When the adder system 100 starts operation, the first and the second x-bit input signals are input along the first n-bit input lines 130*a–h*, 136*a–h*, 142*a–h*, 148*a–h* and the second n-bit input line 133*a–h*, 139*a–h*, 145*a–h*, 151*a–h*. In one embodiment, the x-bit input signal is a 32-bit input signal that is input along an four sets of 8-bit input lines 130*a–h*, 133*a–h*, 136*a–h*, 139*a–h*, 142*a–h*, 145*a–h*, 148*a–h*, 151*a–h*.

FIG. 6 will be described with respect to the first adder block subsystem 102*a*, with the understanding that the operation is similar within the other three adder block subsystems 102*b–d*. When the process starts 605, the first and the second 8-bits (n=8 because x=32) are input 610 into the first adder subsystem 102*a*. As described above, 1-bit from each of the first and the second of the 8-bit input signal is paired and input into the conditional sum-select 210 and the conditional carry-select 215 of the first adder circuit block 110 of the first adder subsystem 102*a*. The conditional sum-select 210 adds the individual pairs of bits. Specifically, the logic adders 395*a–h* of the conditional sum-select 210 compute 620 a sum signal that is output along the first logic adder sum out line 310*a–h*, with the inverse output along the second logic adder sum out line 313-*a–h*. In addition, the conditional carry-select 215 generates 615 an n-bit carry-high signal and an n-bit carry-low signal for the added n-bit input signals. The logic signal value of the carry-high signal bits and the carry-low signal bits determines whether the first or the second logic adder sum out line 310*a–h*, 313*a–h* is selected 630.

The conditional carry-select 215 forwards n–1 carry signal bits to the conditional sum-select 210 and outputs the nth carry signal bit out the most significant carry-high or carry-low line 260*h*, 265*h* as described above in FIGS. 3–5. The conditional sum-select 210 outputs a sum signal of the least significant digit of the added pairs of bits along the sum-high lines 220*a–h* or the sum-low lines 225*a–h* along with the carry bits being forwarded. The output signal along the signal output lines 185 from the first adder subsystem 102*a* is dependent upon the carry signal along the carry-in signal line 155. If the carry-in signal along the carry-in signal line 155 is a logic high the sum output selection switch 160 selects 630 the sum-high line 220 so that the sum signals along that line 220 is output along the output signal line 185. If the carry-in signal along the carry-in signal line 155 is a logic low, the sum output selection switch selects 630 the sum-low line 225 so that the sum signals along that line 225 is output along the output signal line 185.

If the carry-in signal along the carry-in signal line 155 is a logic high, the carry selection switch 163 couples to the most significant carry-high line 260*h* so that the carry signal along that line 260*h* is generated 625 for the sum output selection switch 166 and the carry selection switch 169 of the second adder block subsystem 102b. If the carry-in signal along the carry-in signal line is a logic low, the carry selection switch 163 couples to the most significant carry-low line 265h so that the carry signal along that line 265h is generated 625 for the sum output selection switch 166 and the carry selection switch 169 of the second adder block subsystem 102b. Besides the position of the carry selection switch 163, the carry signal sent to the second adder block subsystem 102b is also based on the logic operations involving the first and the second n-bit input signals in the conditional carry-select 215 in the first adder circuit block 110 of the first adder subsystem 102a as described above in FIGS. 4 and 5.

The second 8-bit input signal set of the first and the second input signals input into the adder system 100 are input into the first and the second 8-bit input lines 136, 139, respectively, of the second adder subsystem 102b. As with the operation in the first adder block subsystem 102a, the second adder subsystem 102b adds the two sets of bits within a conditional sum-select of the second adder circuit block 115 and determines a carry signal within the conditional carry-select of the second adder circuit block 115. The second adder circuit block 115 forwards a sum signal along the sum-high line 230 or the sum-low line 235 and a carry signal along the carry-high line 270h or the carry-low line 275h. The signal along the second output signal line 188 from the second adder subsystem 102b represents the least significant digit of the sum of the first and the second input signal into the second adder block subsystem 102b.

The output signal along the second output signal line 188 is the signal along the sum-high line 230 or the sum-low line 235, depending on the value of the carry signal along the carry forward line 199a. If the carry signal along the carry forward line 199a is a logic high, the sum output selection switch 166 of the second adder block subsystem 102b selects 635 the sum-high line 230 that is coupled to the second adder circuit block 115. If the carry signal along the carry forward line 199a is a logic low, the sum output selection switch 166 of the second adder block subsystem 102b selects the sum-low line 235 that is coupled to the second adder circuit block 115. The carry signal that is generated 625 and forwarded from the second adder block subsystem 102b to the third adder block subsystem 102c is the carry signal along the carry-high line 270h of the second adder circuit block 115 or the carry signal along the carry-low line 275h of the second adder circuit block 115 depending upon whether the carry signal along the carry forward line 199a from the first adder subsystem 102a was a logic high or a logic low, respectively.

Similar to the first and the second adder block subsystems 102a, 102b, the third and the fourth adder block subsystems 102c, 102d add the third and the fourth 8-bit input signal sets, respectively, of the first and the second input signals input along the first and the second 8-bit input lines 142, 148, 145, 151, respectively, in their appropriate adder circuit blocks 120, 125. The conditional sum-select of each adder circuit block 120, 125 produces a sum signal along the sum-high line 240, 250 or the sum-low line 245, 255 while the conditional carry-select of each adder circuit block 245, 255 produces a carry signal along the carry-high line 280h, 290h or the carry-low line 285h, 295h.

The 8-bit output signal along the third output signal line 191 of the third adder subsystem 102c is either the sum signal selected 635 along the sum-high line 240 if the carry signal along the carry forward line 199b of the second adder block subsystem 102b is a logic high, or is the sum signal selected 635 along the sum-low line 245 if the carry signal along the carry forward line 199b of the second adder block subsystem 102b is a logic low. The carry signal from the third adder block subsystem 102c that is generated 625 and forwarded to the fourth adder block subsystem 102d along the carry forward line 199c from the third adder block subsystem 102c is either the carry signal along the carry-high line 280h if the carry signal from the second adder subsystem 102b is a logic high, or the carry signal along the carry-low line 285h if the carry signal from the second adder subsystem 102b is a logic low.

The 8-bit output signal along the fourth output signal line 194 of the fourth adder block subsystem 102d is either the sum signal selected 635 along the sum-high line 250 if the carry signal along the carry forward line 199c of the third adder block subsystem 102c is a logic high, or is the sum signal selected 635 along the sum-low line 255 if the carry signal along the carry forward line 199c of the third adder block subsystem 102c is a logic low. The carry signal along the carry forward line 199d of the fourth adder subsystem 102d that is generated 625 from the adder system 100 is either the carry signal along the carry-high line 290h if the carry signal from the third adder subsystem 102c is a logic high, or the carry signal along the carry-low line 295h if the carry signal from the third adder subsystem 102c is a logic low.

Thus, adding the first and the second 32-bit input signals in the adder system 100 produces a 32-bit output signal along the first through fourth output signal lines 185, 188, 191, 194, along with a carry signal along the carry forward line 199d of the fourth adder subsystem 102d. Through the use of the conditional carry-select within each adder circuit block 110, 115, 120, 125, the delay associated with the propagation of carry signals is significantly reduced because the total number of gate delays from input to output within the logic circuitry for the carry operation is reduced. Thus, there is an overall increase in the circuit speed of the adder system 100. The conditional carry-select of the present invention also advantageously reduces the number of circuit components for propagating a carry signal so that in addition to reducing circuit delays there is also a reduction in chip surface area necessary for implementing the adder system 100.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. An adder having at least one adder circuit block, each adder circuit block comprising:

a first n-bit input line for inputting first n-bit input signal and a second n-bit input line for inputting a second n-bit input signal;

a conditional carry-select circuit, having a first (n−1-bit carry-high signal line and a second (n−1)-bit carry-low signal line and having a 1-bit carry-high signal line and a 1-bit carry-low signal line, the conditional carry-select circuit disposed to receive the first n-bit input signal line and the second n-bit input signal line, the conditional carry-select circuit for producing a carry-out signal from an adder circuit block; and a conditional sum-select circuit, having an n-bit high-sum line and an n-bit low-sum line, and disposed to receive the first n-bit input line, the second n-bit input line, the (n−1)-bit carry-high line, and the (n−1)-bit carry-low line, the conditional sum-select circuit for adding the first n-bit input signal and the second n-bit input signal and producing an n-bit output signal representing a least significant digit of the added n-bit input signals and one of the (n−1)-bit carry-high line or the (n−1)-bit carry-low line.

2. The adder system in claim 1, wherein the conditional carry-select circuit further comprises at least one logic OR subcircuit having an output enable line and at least one logic AND subcircuit having an output enable line, each coupled to one bit of each of the first n-bit signal and the second n-bit signal, the output enable line from a logic OR subcircuit coupled a first multiplexer, the first multiplexer enabled on a high signal along the output enable line from the logic OR subcircuit, and the output enable line from a logic AND subcircuit coupled to a second multiplexer the second multiplexer enabled on a high signal along the output enable line from the logic AND subcircuit.

3. The adder system in claim 2, wherein the first multiplexer is coupled to a carry-high signal line and the second multiplexer is coupled to a carry-low signal line.

4. In an adder system having a conditional carry-select circuit for propagating a carry signal in the adder system comprising:
   a first and a second logic OR subcircuit, each having a logic OR output line and each logic OR subcircuit coupled to receive a first and a second bit input line, and
   a first and a second logic AND subcircuit, each having a logic AND output line and each logic AND subcircuit coupled to receive the first and the second bit input line, each logic OR subcircuit producing a first carry-high signal along the logic OR output line of the first logic OR subcircuit and each logic AND subcircuit producing a first carry-low signal along the logic AND output line of the second logic AND subcircuit;
   a first and a second line multiplexer, each having a line multiplexer output line and each coupled to receive the logic OR output line of the second logic OR subcircuit and each coupled to receive the logic AND output line of the second logic AND subcircuit, the first line multiplexer coupled to the logic OR output line of the first logic OR subcircuit for selectively coupling the line multiplexer output line of the first line multiplexer between the logic OR output line of the second logic OR subcircuit or the logic AND output line of the second logic AND subcircuit, and the second line multiplexer coupled to the logic AND output line of the first logic AND subcircuit for selectively coupling the line multiplexer output line of the second multiplexer between the logic OR output line of the second logic OR subcircuit or the logic AND output line of the second logic AND subcircuit.

5. The conditional carry select circuit in claim 4, further comprising a third and a fourth logic OR subcircuit, each having a logic OR output line and each coupled to receive a third and a fourth bit input line, and a third and a fourth logic AND subcircuit, each having a logic AND output line and each coupled to receive the third and the fourth bit input line; and
   a third and a fourth line multiplexer, each having a line multiplexer output line and each coupled to receive the third logic OR output line and the third logic AND output line, the third line multiplexer coupled to receive the line multiplexer output line of the first line multiplexer for selectively coupling the line multiplexer output line of the third line multiplexer between the third logic OR output line or the third logic AND output line and the fourth line multiplexer coupled to receive the line multiplexer output line of the second line multiplexer for selectively coupling the line multiplexer output line of the fourth line multiplexer between the third logic OR output line or the third logic AND output line.

6. The conditional carry select circuit in claim 5 further comprising a fifth and a sixth line multiplexer, each having a line multiplexer output line and each coupled to receive the fourth logic OR output line and the fourth logic AND output line, the fifth line multiplexer coupled to receive the third logic OR output line for selectively coupling the line multiplexer output line of the fifth line multiplexer between the fourth logic OR output line or the fourth logic AND output line and the sixth line multiplexer coupled to receive the third logic AND output line for selectively coupling the line multiplexer output line of the sixth line multiplexer between the fourth logic OR output line or the fourth logic AND output line; and
   a seventh and an eighth line multiplexer, each having a line multiplexer output line and each coupled to receive the line multiplexer output line from the fifth line multiplexer and the sixth line multiplexer, the seventh line multiplexer coupled to receive the line multiplexer output line of the first line multiplexer for selectively coupling the line multiplexer output line of the seventh line multiplexer between the line multiplexer output line of the fifth line multiplexer or the sixth line multiplexer, and the eighth line multiplexer coupled to receive the line multiplexer output line of the second line multiplexer for selectively coupling the line multiplexer output line of the eighth line multiplexer between the line multiplexer output line of the fifth line multiplexer or the sixth line multiplexer.

7. In an adder system having a conditional sum-select circuit and a conditional carry-select circuit, a method for reducing carry signal propagation delays, comprising:
   inputting a first signal having n-bits and a second signal having n-bits, each bit of first signal paired with a respective bit of the second signal, beginning with the least significant bits and ending with the most significant bits, into the conditional sum-select circuit and the conditional carry-select circuit;
   adding the paired bits of the first and the second input signals in the conditional sum-select circuit for generating a sum signal having n-bits;
   determining a carry signal having n-bits for the paired bits of the first and the second input signals in the conditional carry-select circuit;
   forwarding n−1 bits of the carry signal to the conditional sum-select circuit to sum with the added paired bits for generating the sum signal having n-bits; and
   outputting the nth bit of the carry signal as the carry signal for the adder system.

8. The method in claim 7, further comprising producing the sum signal along at least one of a sum-high line and a sum-low line.

9. The method in claim 8, further comprising selecting, through a sum selection switch, either the sum-high line or the sum-low line to couple the selected line with an output line for outputting the generated sum signal.

* * * * *

UNITED STATES PATENT AND TRADEMARK OFFICE
CERTIFICATE OF CORRECTION

PATENT NO.: 5,852,568

DATED: December 22, 1998

INVENTOR: Nalini Ranjan

It is certified that an error appears in the above-identified patent and that said Letters Patent is hereby corrected as shown below:

Column 20, line 59, replace "(n-1-bit" with --(n-1)-bit--.

Signed and Sealed this

First Day of May, 2001

Attest:

NICHOLAS P. GODICI

*Attesting Officer*     *Acting Director of the United States Patent and Trademark Office*